(12) United States Patent
Feng et al.

(10) Patent No.: US 10,399,311 B2
(45) Date of Patent: Sep. 3, 2019

(54) THIN AND HIGH STRENGTH COMPOSITE LAMINATE AND MANUFACTURING METHOD THEREOF

(71) Applicant: SAN FANG CHEMICAL INDUSTRY CO., LTD, Kaohsiung (TW)

(72) Inventors: Chung-Chih Feng, Kaohsiung (TW);
Chih-Yi Lin, Kaohsiung (TW);
Pai-Hsiang Wu, Kaohsiung (TW);
Kao-Lung Yang, Kaohsiung (TW);
Chien-Chia Huang, Kaohsiung (TW);
Chieh Lee, Kaohsiung (TW); Chi-Chin Chiang, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 197 days.

(21) Appl. No.: 15/293,070

(22) Filed: Oct. 13, 2016

(65) Prior Publication Data
US 2017/0266937 A1 Sep. 21, 2017

(30) Foreign Application Priority Data

Mar. 21, 2016 (TW) .............................. 105108703 A (51) Int. Cl.
*B32B 27/40* (2006.01)
*B32B 27/12* (2006.01)
(Continued)

(52) U.S. Cl.
CPC ................ *B32B 27/40* (2013.01); *B32B 3/30* (2013.01); *B32B 5/024* (2013.01); *B32B 5/026* (2013.01);
(Continued)

(58) Field of Classification Search
CPC .............. C07K 14/415; C12N 15/8245; C12N 15/8246; C12N 15/8255; C12N 15/8261;
(Continued)

(56) References Cited

U.S. PATENT DOCUMENTS

2010/0092726 A1 4/2010 Schuette et al.
2016/0053434 A1 2/2016 Feng et al.

FOREIGN PATENT DOCUMENTS

CN 101779847 A 7/2010
CN 101959676 A 1/2011
(Continued)

OTHER PUBLICATIONS

Search Report dated May 4, 2017 by EPO for the corresponding EP Patent Application No. 16193924.4.
(Continued)

*Primary Examiner* — Arti Singh-Pandey
(74) *Attorney, Agent, or Firm* — WPAT, P.C, Intellectual Property Attorneys; Anthony King (57) ABSTRACT

A thin and high strength composite laminate includes a fabric, an elastic layer and a water-based polyurethane layer. The fabric is weaved by high-tenacity filament or high-tenacity monofilament. The high-tenacity filament or high-tenacity monofilament is made of polyethylene terephthalate (PET). The fabric has a first surface and a second surface opposite to the first surface. The elastic layer is laminated on the first surface of the fabric. The water-based polyurethane layer is laminated on the second surface of the fabric. In this way, a thin, anti-fouling, abrasion resistance and high physical strength composite laminate can be manufactured.

18 Claims, 5 Drawing Sheets

(51) Int. Cl.
  B32B 7/12      (2006.01)
  B32B 37/06     (2006.01)
  B32B 37/14     (2006.01)
  B32B 37/12     (2006.01)
  B32B 5/02      (2006.01)
  B32B 5/10      (2006.01)
  B32B 7/06      (2019.01)
  B32B 27/34     (2006.01)
  B32B 27/36     (2006.01)
  B32B 3/30      (2006.01)

(52) U.S. Cl.
  CPC ............... *B32B 5/10* (2013.01); *B32B 7/06* (2013.01); *B32B 7/12* (2013.01); *B32B 27/12* (2013.01); *B32B 27/34* (2013.01); *B32B 27/36* (2013.01); *B32B 37/06* (2013.01); *B32B 37/12* (2013.01); *B32B 37/14* (2013.01); *B32B 2250/03* (2013.01); *B32B 2250/24* (2013.01); *B32B 2262/0284* (2013.01); *B32B 2274/00* (2013.01); *B32B 2307/50* (2013.01); *B32B 2307/51* (2013.01); *B32B 2307/536* (2013.01); *B32B 2307/54* (2013.01); *B32B 2307/554* (2013.01); *B32B 2307/5825* (2013.01); *B32B 2307/70* (2013.01); *B32B 2307/718* (2013.01); *B32B 2307/732* (2013.01); *B32B 2367/00* (2013.01); *B32B 2437/02* (2013.01)

(58) Field of Classification Search
  CPC ... Y02A 40/146; Y02E 50/16; B32B 2250/24; B32B 2262/0284; B32B 2274/00; B32B 2307/51; B32B 2307/54; B32B 2307/554; B32B 2307/5825; B32B 2367/00; B32B 2437/02; B32B 27/12; B32B 27/34; B32B 27/36; B32B 27/40; B32B 37/06; B32B 37/12; B32B 37/14; B32B 5/024; B32B 5/10; B32B 7/06; B32B 7/12
  See application file for complete search history.

(56)         References Cited

FOREIGN PATENT DOCUMENTS

| CN | 202023098 U   | 11/2011 |
| CN | 105350339 A   | 2/2016  |
| JP | 2001271274 A  | 10/2001 |
| JP | 2008-279700 A | 11/2008 |
| TW | M451012       | 4/2013  |
| TW | M456105       | 7/2013  |
| TW | 201410170     | 3/2014  |
| TW | I465341       | 12/2014 |
| TW | I470126       | 1/2015  |

OTHER PUBLICATIONS

Office action dated Aug. 1, 2016 for the corresponding Taiwan Patent Application No. 105108703.
Search report dated Aug. 1, 2016 for the corresponding Taiwan Patent Application No. 105108703.
English translation of the search report dated Aug. 1, 2016 for the corresponding Taiwan Patent Application No. 105108703.
English abstract translation of JP2008-279700A.
English abstract translation of CN101959676A.
English abstract translation of CN101779847A.
1st Office Action dated Sep. 29, 2018 by SIPO for the corresponding CN Patent Application No. 201610255840.1.
1st Search Report dated Sep. 29, 2018 by SIPO for the corresponding CN Patent Application No. 201610255840.1.
English translation of the 1st Search Report dated Sep. 29, 2018 by SIPO for the corresponding CN Patent Application No. 201610255840.1.
English abstract translation of CN105350339A.
English abstract translation of CN202023098U.
English abstract translation of JP2001271274A.

THIN AND HIGH STRENGTH COMPOSITE LAMINATE AND MANUFACTURING METHOD THEREOF

FIELD

The disclosure relates to a laminate and manufacturing method thereof, more particular to a thin and high strength composite laminate and manufacturing method thereof.

BACKGROUND

Common laminates for shoes are mainly divided into artificial leather and fabric which made by weaving or knitting.

Whether the artificial leather is based on a dry process or a wet process, its thickness is between 0.8 mm and 1.3 mm, and the use of the interval of the thickness is mainly for retaining the hand feeling of the artificial leather. When the thickness is lower than 0.8 mm, the hand feeling of the artificial leather is paper-like; when the thickness is greater than 1.3 mm, the artificial leather is too stiff. Although the hand feeling of the artificial leather can be adjusted and changed through the control over the thickness, as the laminate for shoes, the thickness and weight thereof still cannot effectively decrease and thin.

In addition to the artificial leather, in recent years, woven mesh or knitted mesh have been used commonly as a laminate for shoes; the woven mesh or knitted mesh mainly made by filament, and the mesh having different colors and different textures through weaving technology, and then is used as the laminate for shoes. However, although the mesh has a light weight effect, the mesh has poor physical properties, especially worse abrasion, because filament or yarn are susceptible to abrasion to form broken filament (hairiness) and the mesh cannot have various colors and varying surface texture like the artificial leather. In addition, the yarn have poor anti-fouling effects and are not easy to clean, and if the yarn are used in sports shoe materials, they are easy to cause damage and dirt.

The conventional laminates for shoes are analyzed as in the following patent documents of prior arts.

1. TW M456105

Practice: knitted vamp is used.

Disadvantage: the color is limited and not easy to change, and it has poor abrasion resistance.

2. TW M451012

Practice: knitted vamp is used.

Disadvantage: the color is limited and not easy to change, and it has poor abrasion resistance.

3. TW 201410170

Practice: composite fiber is used.

Disadvantage: the color is limited and not easy to change, and hand feeling is too stiff.

4. TW 1470126

Practice: low-strength and low-modulus composite fiber is used.

Disadvantage: it is only applied to label cloth easy to tear or serves as a laminate of cloth easy to tear, and has poor physical property and strength.

5. TW 1465341

Practice: composite woven fabric is used.

Disadvantage: its surface change is easy to be limited by fabric, and it has a poor anti-fouling effect.

Based on the foregoing analysis, it is necessary to provide a thin and high strength composite laminate and manufacturing method thereof, so as to solve the foregoing deficiencies in the prior art.

SUMMARY OF THE INVENTION

In accordance with one aspect of the present disclosure, a thin and high strength composite laminate includes a fabric, an elastic layer and a water-based polyurethane layer. The fabric is weaved by high tenacity filament or high tenacity monofilament. The high tenacity filament or high tenacity monofilament is made of polyethylene terephthalate (PET). The fabric has a first surface and a second surface opposite to the first surface. The elastic layer is laminated on the first surface of the fabric. The water-based polyurethane layer is laminated on the second surface of the fabric.

In accordance with another aspect of the present disclosure, a manufacturing method of a thin and high strength composite laminate includes step in which a fibrous material is provided, wherein the fibrous material is polyethylene terephthalate (PET). The method continues with step in which the fibrous material is molten for spinning by using a melt spinning machine or monofilament spinning machine, and is drawn with a multi drawing roller, to manufacture high-tenacity filament or high-tenacity monofilament. The method continues with step in which the high-tenacity filament or high-tenacity monofilament is weaved or knitted into a fabric, wherein the fabric has a first surface and a second surface opposite to the first surface. The method continues with step in which an elastic layer is laminated on the first surface of the fabric. The method continues with step in which a water-based polyurethane layer is laminated on the second surface of the fabric, to manufacture the thin and high strength composite laminate.

The present disclosure can weave a fabric with the high-tenacity filament or high-tenacity monofilament manufactured with polyethylene terephthalate (PET), and by respectively laminating the elastic layer and the water-based polyurethane layer on the fabric, can manufacture a composite laminate which is thin, anti-fouling, abrasion resistance and has high physical strength.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
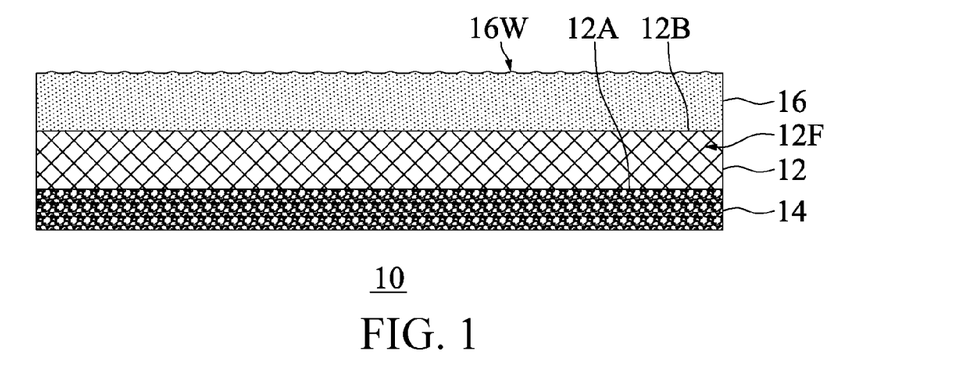
FIG. 1 shows a schematic structural view of a thin and high strength composite laminate according to the present disclosure.

Referring to FIG. 1, which shows a schematic structural view of a thin and high strength composite laminate according to the present disclosure. The thin and high strength composite laminate 10 of the present disclosure includes a fabric 12, an elastic layer 14 and a water-based polyurethane layer 16.

The fabric 12 is weaved by high-tenacity filament or high-tenacity monofilament 12F, and the high-tenacity filament or high-tenacity monofilament 12F is made of polyethylene terephthalate (PET). Preferably, a fiber strength of the high-tenacity filament or high-tenacity monofilament 12F is 7 to 14 g/den inclusive. In addition, the fabric 12 has a first surface 12A and a second surface 12B, and the second surface 12B is opposite to the first surface 12A.

The elastic layer 14 is laminated on the first surface 12A of the fabric 12. In this embodiment, the elastic layer 14 is made of a thermoplastic polyurethane elastomer, a thermoplastic polyamide elastomer or a thermoplastic polyester elastomer.

The water-based polyurethane layer 16 is laminated on the second surface 12B of the fabric 12. In this embodiment, a viscosity of the water-based polyurethane layer 16 is 2000 to 4600 cps inclusive, and a solid content thereof is 33 to 45% inclusive. Furthermore, the water-based polyurethane layer 16 can have a patterned structure 16W.

Figure 2:
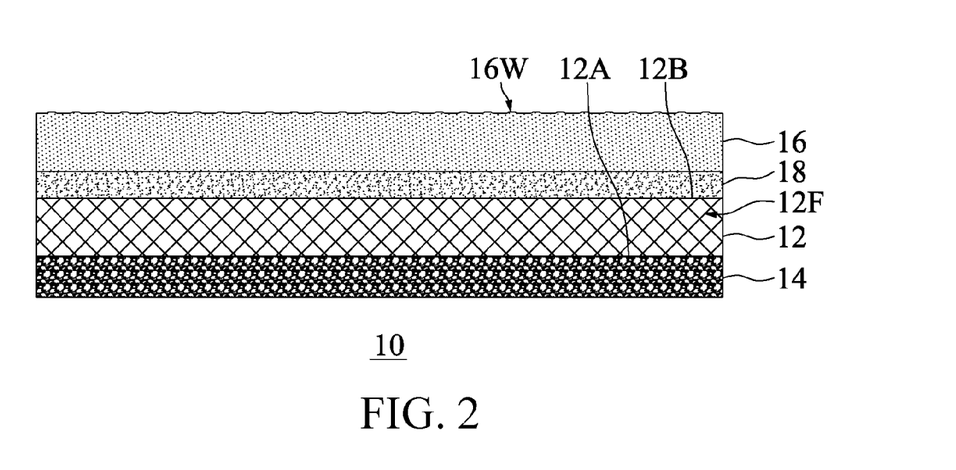
FIG. 2 shows another schematic structural view of a thin and high strength composite laminate according to the present disclosure.

Referring to FIG. 2, which shows another schematic structural view of a thin and high strength composite laminate according to the present disclosure. As shown in FIG. 2, in another embodiment, the thin and high strength composite laminate 10 can include an adhesive layer 18, and the adhesive layer 18 is disposed between the fabric 12 and the water-based polyurethane layer 16, to increase a bonding strength between the fabric 12 and the water-based polyurethane layer 16. Preferably, the adhesive layer 18 is a water-based binder or a high solid-content binder, a viscosity of the water-based binder is 7000 to 16000 cps inclusive, and a solid content of the high solid-content binder is 70% to 90% inclusive.

Figure 3:
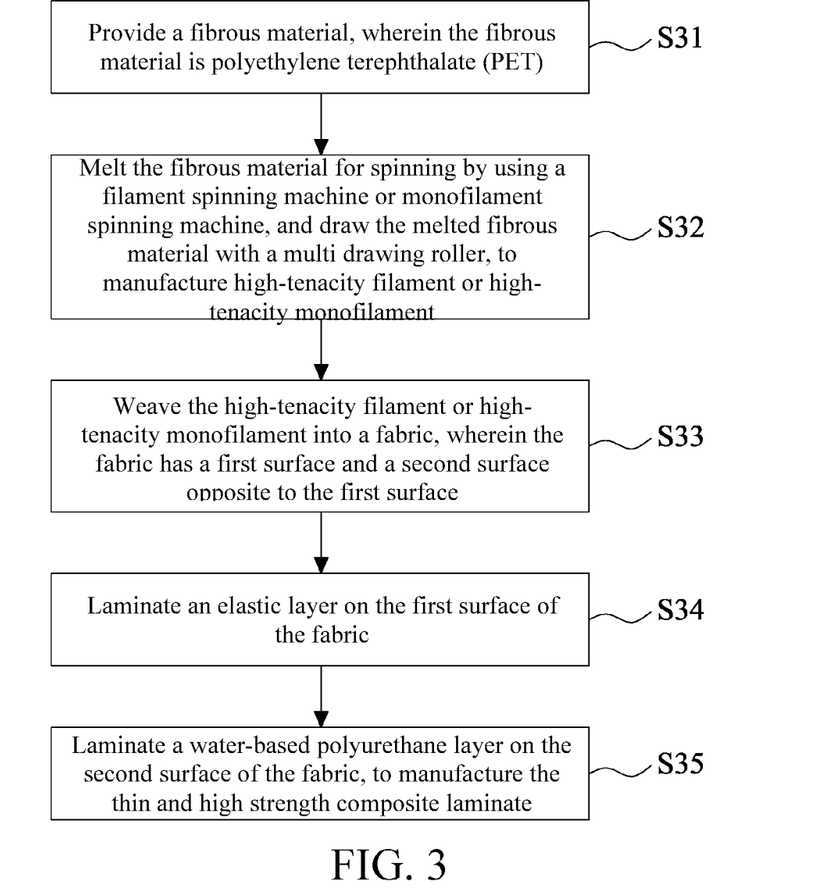
FIG. 3 shows a flow diagram of a manufacturing method of a thin and is high strength composite laminate according to the present disclosure.
Figure 3A:
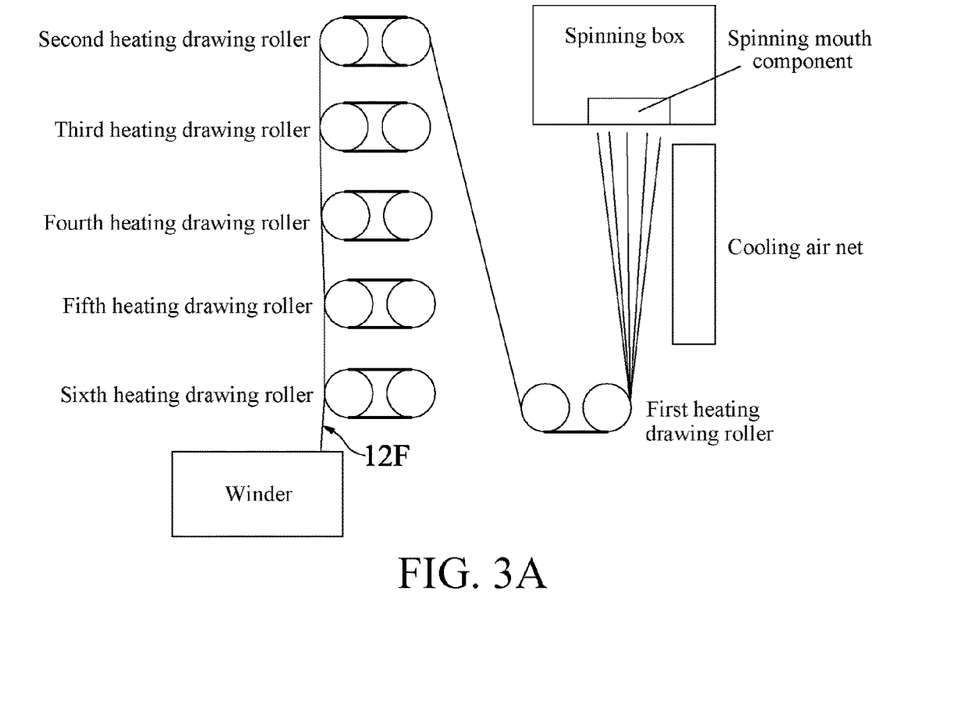
FIG. 3A shows a schematic view of a process of high-tenacity filament or high-tenacity monofilament in the manufacturing method of a thin and high strength composite laminate according to the present disclosure.
Figure 3B:
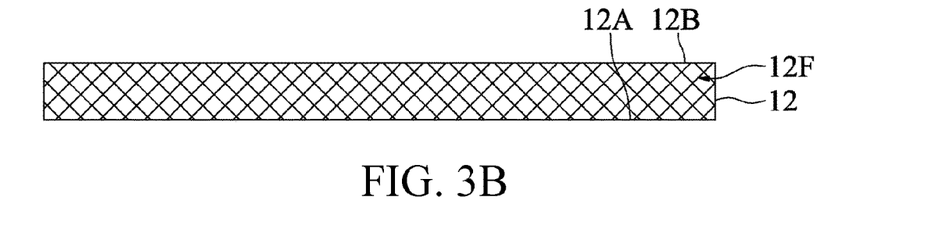
FIG. 3B shows a schematic view of weaving high-tenacity filament into a fabric with the manufacturing method of a thin and high strength composite laminate according to the present disclosure.
Figure 3C:
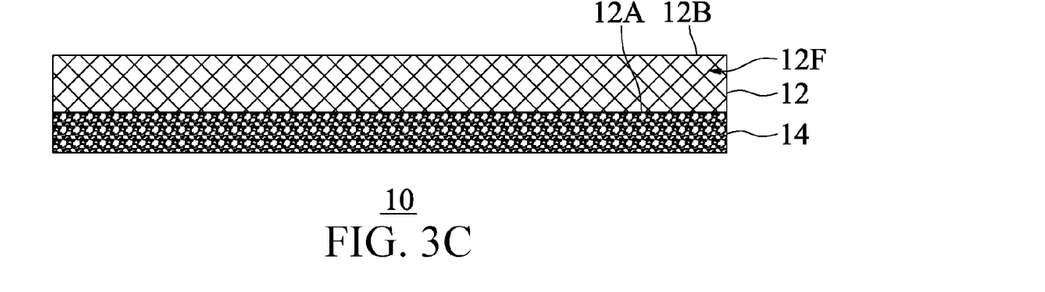
FIG. 3C shows a schematic view of laminating an elastic layer on a fabric with the manufacturing method of a thin and high strength composite laminate according to the present disclosure.
Figure 3D:
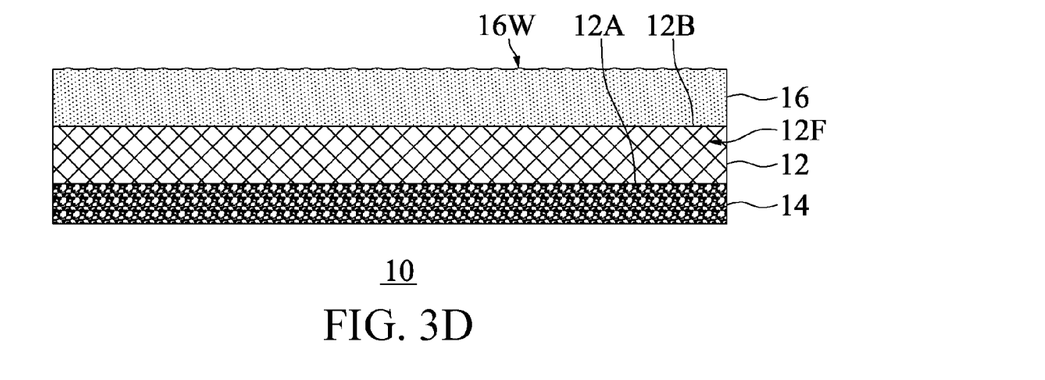
FIG. 3D shows a schematic view of laminating a water-based polyurethane layer on a fabric with the manufacturing method of a thin and high strength composite laminate according to the present disclosure.

FIG. 3 shows a flow diagram of a manufacturing method of a thin and high strength composite laminate according to the present disclosure. FIG. 3A shows a schematic view of a process of high-tenacity filament or high-tenacity monofilament in the manufacturing method of a thin and high strength composite laminate according to the present disclosure. FIG. 3B shows a schematic view of weaving high-tenacity filament into a fabric with the manufacturing method of a thin and high strength composite laminate according to the present disclosure. FIG. 3C shows a schematic view of laminating an elastic layer on a fabric with the manufacturing method of a thin and high strength composite laminate according to the present disclosure. FIG. 3D shows a schematic view of laminating a water-based polyurethane layer on a fabric with the manufacturing method of a thin and high strength composite laminate according to the present disclosure.

Referring to step S31 of FIG. 3, a fibrous material is provided, wherein the fibrous material is polyethylene terephthalate (PET). Preferably, an intrinsic viscosity (IV) of the fibrous material is 0.9 to 1.1 inclusive.

Referring to step S32 of FIG. 3 and FIG. 3A, the fibrous material is molten for spinning by using a filament spinning machine or monofilament spinning machine, and is drawn with a multi drawing roller, to manufacture high-tenacity filament or high-tenacity monofilament 12F. In this step, a spinning manifold temperature of the filament spinning machine or monofilament spinning machine is 295 to 315° C. inclusive, and a winding speed is 2200 to 3500 m/min inclusive. In addition, the fiber tenacity of the manufactured high-tenacity filament or high-tenacity monofilament 12F is 7 to 14 g/den inclusive, and the fiber denier specification is 150 den/48 f or 0.12-mm wire diameter.

Referring to step S33 of FIG. 3 and FIG. 3B, the high-tenacity filament or high-tenacity monofilament 12F is weaved into a fabric 12, the fabric 12 has a first surface 12A and a second surface 12B, and the second surface 12B is opposite to the first surface 12A. In this step, the high-tenacity filament or high-tenacity monofilament 12F can be woven or knitted into the fabric 12 with a circular knitting machine, a warp knitting machine, a shuttle loom or a non-shuttle loom (e.g., a water-jet loom or an air-jet loom).

Referring to step S34 of FIG. 3 and FIG. 3C, an elastic layer 14 is laminated on the first surface 12A of the fabric 12. In this step, the elastic layer 14 is laminated on the first surface 12A of the fabric 12 through a laminator (not shown in the drawings), and the laminator can be a conveyor laminating machine, a roller-type laminating machine or a flat heat-press laminating machine. Furthermore, the elastic layer 14 can be made of a thermoplastic polyurethane elastomer, a thermoplastic polyamide elastomer or a thermoplastic polyester elastomer.

Figure 4:
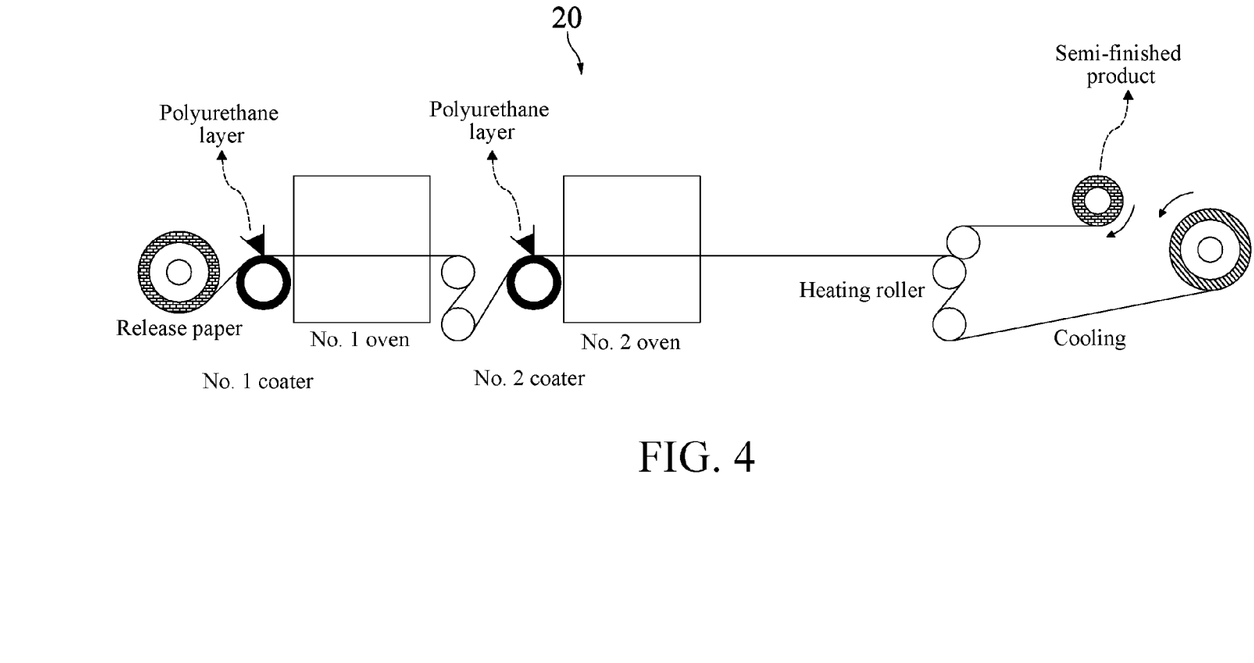
FIG. 4 shows a schematic view of a dry laminator for laminating a water-based polyurethane layer on a fabric according to the present disclosure.

FIG. 4 shows a schematic view of a dry laminator for laminating a water-based polyurethane layer on a fabric according to the present disclosure. Referring to step S35 of FIG. 3, FIG. 3D and FIG. 4, a water-based polyurethane layer 16 is laminated on the second surface 12B of the fabric 12, to manufacture the thin and high strength composite laminate 10. In this step, the water-based polyurethane layer 16 is laminated on the second surface 12B of the fabric 12 through a drying-process lamination 20. Preferably, a viscosity of the water-based polyurethane layer 16 is 2000 to 4600 cps inclusive, and a solid content thereof is 33 to 45% inclusive. In addition, the water-based polyurethane layer 16 can have a patterned structure 16W formed by using a release paper.

Figure 3E:
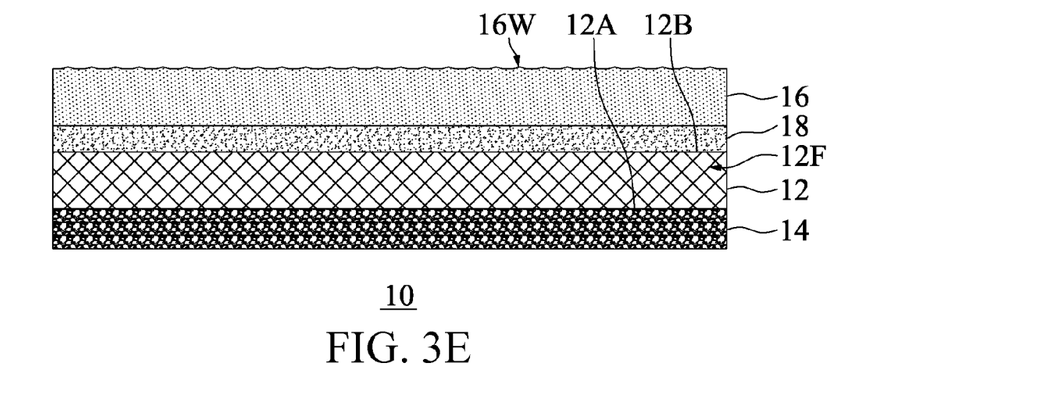
FIG. 3E, which shows a schematic view of disposing an adhesive layer between a fabric and a water-based polyurethane layer with the manufacturing method of a thin and high strength composite laminate according to the present disclosure.

Referring to FIG. 3E, which shows a schematic view of disposing an binder layer between a fabric and a water-based polyurethane layer with the manufacturing method of a thin and high strength composite laminate according to the present disclosure. To increase a bonding strength between the fabric 12 and the water-based polyurethane layer 16, in this step, it is feasible to otherwise dispose a binder layer 18 between the fabric 12 and the water-based polyurethane layer 16. Preferably, the binder layer 18 is a water-based binder or a high solid-content binder, a viscosity of the water-based binder is 7000 to 16000 cps inclusive, and a solid content of the high solid-content binder is 70% to 90% inclusive.

A tensile strength of the thin and high strength composite laminate 10 manufactured in the present disclosure can reach 20 to 50 kg/2.54 cm (ASTM D1682), and a tearing strength thereof can reach 4 to 16 kg (ASTM D2261).

The present disclosure can weave a fabric with the high-tenacity filament or high-tenacity monofilament manufactured with polyethylene terephthalate (PET), and by respectively laminating the elastic layer and the water-based polyurethane layer on the fabric, can manufacture a composite laminate which is thin, anti-fouling, abrasion resistance and has high physical strength. The composite laminate can be applied to shoe processing.

The present disclosure is illustrated in detail with the following embodiments, but it does not mean that the present disclosure is only limited to the content disclosed by these embodiments.

EMBODIMENT 1

The fibrous material in Embodiment 1 was high-viscosity PET, and its intrinsic viscosity (IV) was 0.95. Pellets were first conveyed to a dry barrel for drying, the drying temperature was 170° C., after the pellets were dried for 7 hours, the moisture content of the pellets was controlled to be less than 30 ppm, and then the pellets were conveyed to a filament spinning machine for spinning, wherein the spinning manifold temperature was 300° C., the temperature of the quench air was 14° C., and the relative humidity of the quench air was 50%. During the spinning, the is filament can pass through a multi drawing roller, and the filament was drawn 4.09 times by using the drawing roller, to increase the fiber tenacity and simultaneously reduce the elongation of the filament, which was then wound into a bobbin shape at a winding speed of 2500 m/min via a winder, to manufacture a high-tenacity filament. The specification of the finished high-tenacity filament was 150 den/48 f, and the fiber had the following physical properties: the tenacity was 7.5 g/den and the elongation was 15%.

The high-tenacity filament manufactured above was weaved with a shuttle loom, wherein the warp density was 95 threads per inch, the weft density was 75 threads per inch, and a fabric with the thickness of 0.25 mm and the weight of 118 g/m$^2$ was manufactured. A thermoplastic polyurethane elastomer film was prepared, the melting point was 118° C., the thickness was 0.2 mm, the shore hardness was 80 shore A, and a roller-type laminating machine was used, wherein the roller temperature was 120° C., the roller operating pressure was 20 kg/cm$^2$, the thermoplastic polyurethane elastomer film was laminated on the fabric, to manufacture a semi-finished product. Then a water-based polyurethane solution was prepared, the viscosity was 3100 cps, on a first coater of a drying-process lamination, the coating gap was adjusted to 0.1 mm to carry out coating of water-based polyurethane (PU), to coat the PU on a release paper, which entered a first oven together, the length of the oven was 12 meter, which was divided into six heating zones, sequentially set as 80° C., 90° C., 110° C., 120° C., 120° C. and 130° C. After the water-based PU left the first oven, it passed through a second coater, the coating gap was also 0.1 mm, coating of the second water-based PU was carried out, upon completion of the coating, the PU entered a second oven, at this point, the length of the oven was 8 meter, which was divided into four heating zones, sequentially set as 100° C., 110° C., 120° C. and 120° C. Upon completion of drying, when the release paper having a dried PU film thereon left the oven, it passes through a heating roller, the roller temperature was 120° C., the surface of the semi-finished product not laminated with the thermoplastic polyurethane elastomer film and the water-based PU binder passed through the heating roller for is heat-pressing and lamination, and a composite laminate which was thin, anti-fouling, abrasion resistance and had high physical properties was obtained. The physical properties of the composite laminate were as follows: the tensile strength can reach 32.9 kg/2.54 cm, while the tearing strength can reach 9.2 kg.

EMBODIMENT 2

The fibrous material in Embodiment 2 was high-viscosity PET, and its intrinsic viscosity (IV) was 1.05. Pellets were first conveyed to a dry barrel for drying, the drying temperature was 170° C., after the pellets were dried for 7 hours, the moisture content of the pellets was controlled to be less than 30 ppm, and then the pellets were conveyed to a filament spinning machine for spinning, wherein the spinning manifold temperature was 305° C., the temperature of the quench air was 12° C., and the relative humidity of the quench air was 60%. During the spinning, the filament can pass through a multi drawing roller, and the filament was drawn 4.21 times by using the multi drawing roller, to increase the fiber tenacity and simultaneously reduce the elongation of the filament, which was then wound into a bobbin shape at a winding speed of 2600 m/min via a winder, to manufacture a high-tenacity filament. The specification of the finished high-tenacity filament was 300 den/96 f, and the fiber had the following physical properties: the tenacity was 12.2 g/den and the elongation was 13%.

The high-tenacity filament manufactured above was weaved with a warp knitting machine, wherein the warp density was 140 threads per inch, and a fabric with the thickness of 0.35 mm and the weight of 155 g/m² was manufactured. A thermoplastic polyurethane elastomer film was prepared, the melting point was 108° C., the thickness was 0.15 mm, the shore hardness was 70 shore A, and a roller-type laminating machine was used, wherein the roller temperature was 115° C., the roller operating pressure was 30 kg/cm², the thermoplastic polyurethane elastomer film was laminated on the fabric, to manufacture a semi-finished product. Then a water-based polyurethane solution was prepared, the viscosity was 2750 cps, on a first coater of a drying-process lamination, the coating gap was adjusted to 0.1 mm to carry out coating is of water-based polyurethane (PU), to coat the PU on a release paper, which entered a first oven together, the length of the oven was 12 meter, which was divided into six heating zones, sequentially set as 90° C., 100° C., 115° C., 120° C., 120° C. and 125° C. After the water-based PU left the first oven, it passed through a second coater, the coating gap was also 0.1 mm, a water-based polyurethane binder was prepared, the viscosity was 9500 cps, coating of the second water-based PU was carried out, upon completion of the coating, the PU entered a second oven, at this point, the length of the oven was 8 meter, which was divided into four heating zones, sequentially set as 110° C., 115° C., 115° C. and 120° C. Upon completion of drying, when the release paper having a dried PU film thereon left the oven, it passes through a heating roller, the roller temperature was 115° C., the surface of the semi-finished product not laminated with the thermoplastic polyurethane elastomer film and the water-based PU binder passed through the heating roller for heat-pressing and lamination, and a composite laminate which was thin, anti-fouling, abrasion resistance and had high physical properties was obtained. The physical properties of the composite laminate were as follows: the tensile strength can reach 45.6 kg/2.54 cm, while the tearing strength can reach 12.3 kg.

EMBODIMENT 3

The fibrous material in Embodiment 3 was high-viscosity PET, and its intrinsic viscosity (IV) was 1.1. Pellets were first conveyed to a dry barrel for drying, the drying temperature was 170° C., after the pellets were dried for 7 hours, the moisture content of the pellets was controlled to be less than 30 ppm, and then the pellets were conveyed to a filament spinning machine for spinning, wherein the spinning manifold temperature was 310° C., the temperature of the quench air was 10° C., and the relative humidity of the quench air was 55%. During the spinning, the filament can pass through a multi drawing roller, and the filament was drawn 4.23 times by using the multi drawing roller, to increase the fiber tenacity and simultaneously reduce the elongation of the filament, which was then wound into a bobbin shape at a winding speed of 2750 m/min via a winder, to manufacture a high-tenacity filament. The specification of the finished high-tenacity filament was 100 den/36 f, and the fiber had the following physical properties: the strength was 9.1 g/den and the elongation was 9%.

The high-tenacity filament manufactured above was weaved with a water-jet weaving machine, wherein the warp density was 120 threads per inch, the weft density was 90 threads per inch, and a fabric with the thickness of 0.3 mm and the weight of 130 g/m² was manufactured. A thermoplastic polyamide elastomer film was prepared, the melting point was 158° C., the thickness was 0.15 mm, the shore hardness was 90 shore A, and a roller-type laminating machine was used, wherein the roller temperature was 165° C., the roller operating pressure was 35 kg/cm², the thermoplastic polyamide elastomer film was laminated on the fabric, to manufacture a semi-finished product. Then a water-based polyurethane solution was prepared, the viscosity was 2350 cps, on a first coater of a drying-process lamination, the coating gap was adjusted to 0.1 mm to carry out coating of water-based polyurethane (PU), to coat the PU on a release paper, which entered a first oven together, the length of the oven was 12 meter, which was divided into six heating zones, sequentially set as 90° C., 100° C., 115° C., 120° C., 120° C. and 125° C. After the water-based PU left the first oven, it passed through a second coater, the coating gap was 0.07 mm, a water-based polyurethane binder was prepared, the viscosity was 12000 cps, coating of the second water-based PU was carried out, upon completion of the coating, the PU entered a second oven, at this point, the length of the oven was 8 meter, which was divided into four heating zones, sequentially set as 110° C., 115° C., 115° C. and 120° C. Upon completion of drying, when the release paper having a dried PU film thereon left the oven, it passes through a heating roller, the roller temperature was 165° C., the surface of the semi-finished product not laminated with the thermoplastic polyamide elastomer film and the water-based PU binder passed through the heating roller for heat-pressing and lamination, and a composite laminate which was thin, anti-fouling, abrasion resistance and had high physical properties was obtained. The physical properties of the composite laminate were as follows: the tensile strength can reach 42.6 kg/2.54 cm, while the tearing strength can reach 15.9 kg.

EMBODIMENT 4

The fibrous material in Embodiment 4 was high-viscosity PET, and its intrinsic viscosity (IV) was 1.1. Pellets were first conveyed to a dry barrel for drying, the drying temperature was 170° C., after the pellets were dried for 7 hours, the moisture content of the pellets was controlled to be less than 30 ppm, and then the pellets were conveyed to a filament spinning machine for spinning, wherein the spinning manifold temperature was 305° C., the temperature of the quench air was 8° C., and the relative humidity of the quench air was 65%. During the spinning, the filament can pass through a multi drawing roller, and the filament was drawn 5.4 times by using the multi drawing roller, to increase the fiber tenacity and simultaneously reduce the elongation of the tenacity, which was then wound into a bobbin shape at a winding speed of 850 m/min via a winder, to manufacture a high-tenacity monofilament. The specification of the finished high-tenacity monofilament was 0.12-mm wire diameter, and the monofilament had the following physical properties: the tensile strength was 8.6 g/den and the elongation was 30%.

The high-tenacity monofilament manufactured above was weaved with a Warp knitting, wherein the warp density was 50 threads per inch, the weft density was 50 threads per inch, and a fabric with the thickness of 0.12 mm and the weight of 65 g/m² was manufactured. A thermoplastic polyester elastomer film was prepared, the melting point was 122° C., the thickness was 0.15 mm, the shore hardness was 75 shore A, and a roller-type laminating machine was used, wherein the roller temperature was 125° C., the roller operating pressure was 20 kg/cm², the thermoplastic polyester elastomer film was laminated on the fabric, to manufacture a semi-finished product. Then a water-based polyurethane solution was prepared, the viscosity was 1850 cps, on a first coater of a drying-process lamination, the coating gap was adjusted to 0.1 mm to carry out coating of water-based polyurethane (PU), to coat the PU on a release paper, which entered a first oven together, the length of the oven was 12 meter, which was divided into six heating zones, sequentially set as 80° C., 90° C., 110° C., 120° C., 120° C. and 130° C. After the water-based PU left the first oven, it passed through a second coater, the coating gap was 0.1 mm, coating of the second water-based PU was carried out, upon completion of the coating, the PU entered a second oven, at this point, the length of the oven was 8 meter, which was divided into four heating zones, sequentially set as 100° C., 110° C., 120° C. and 120° C. Upon completion of drying, when the release paper having a dried PU film thereon left the oven, it passes through a heating roller, the roller temperature was 135° C., the surface of the semi-finished product not laminated with the thermoplastic polyester elastomer film and the water-based PU binder passed through the heating roller for hot-pressing and lamination, and a composite laminate which was thin, anti-fouling, abrasion resistance and had high physical properties was obtained. The physical properties of the composite laminate were as follows: the tensile strength can reach 39.3 kg/2.54 cm, while the tearing strength can reach 18.8 kg.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A thin and high strength composite laminate, comprising:
    a fabric weaved by high-tenacity filament or high-tenacity monofilament, the high-tenacity filament or high-tenacity monofilament is made of polyethylene terephthalate (PET), and the fabric has a first surface and a second surface opposite to the first surface;
    an elastic layer laminated on the first surface of the fabric; and
    a water-based polyurethane layer laminated on the second surface of the fabric.

2. The composite laminate of claim 1, wherein a fiber strength of the high-tenacity filament or high-tenacity monofilament is 7 to 14 g/den inclusive.

3. The composite laminate of claim 1, wherein a viscosity of the water-based polyurethane layer is 2000 to 4600 cps inclusive.

4. The composite laminate of claim 1, wherein a solid content of the is water-based polyurethane layer is 33 to 45% inclusive.

5. The composite laminate of claim 1, wherein the elastic layer is made of a thermoplastic polyurethane elastomer, a thermoplastic polyamide elastomer or a thermoplastic polyester elastomer.

6. The composite laminate of claim 1, further comprising an adhesive layer disposed between the fabric and the water-based polyurethane layer.

7. The composite laminate of claim 6, wherein the adhesive layer is a water-based binder or a high solid-content binder.

8. The composite laminate of claim 7, wherein a viscosity of the water-based binder is 7000 to 16000 cps inclusive.

9. The composite laminate of claim 7, wherein a solid content of the high solid-content binder is 70% to 90% inclusive.

10. A manufacturing method of a thin and high strength composite laminate, comprising:
    (a) providing a fibrous material, wherein the fibrous material is polyethylene terephthalate (PET);
    (b) Melting the fibrous material for spinning by using a filament spinning machine or monofilament spinning machine, and drawing the melted fibrous material with a multi drawing roller, to manufacture high-tenacity filament or high-tenacity monofilament;
    (c) weaving the high-tenacity filament or high-tenacity monofilament into a fabric, wherein the fabric has a first surface and a second surface opposite to the first surface;
    (d) laminating an elastic layer on the first surface of the fabric; and
    (e) laminating a water-based polyurethane layer on the second surface of the fabric, to manufacture the thin and high strength composite laminate.

11. The manufacturing method of claim 10, wherein an intrinsic viscosity (IV) of the fibrous material of the step (a) is 0.9 to 1.1 inclusive.

12. The manufacturing method of claim 10, wherein a fiber strength of the manufactured high-tenacity filament or high-tenacity monofilament in the step (b) is 7 to 14 g/den inclusive.

13. The manufacturing method of claim 10, wherein the elastic layer is laminated on the first surface of the fabric through a laminator in the step (d).

14. The manufacturing method of claim 10, wherein the water-based polyurethane layer is laminated on the second surface of the fabric through a dry laminator in the step (e).

15. The manufacturing method of claim 10, wherein a viscosity of the water-based polyurethane layer of the step (e) is 2000 to 4600 cps inclusive.

16. The manufacturing method of claim 10, wherein a solid content of the water-based polyurethane layer of the step (e) is 33 to 45% inclusive.

17. The manufacturing method of claim 10, further comprising disposing an adhesive layer between the fabric and the water-based polyurethane layer in the step (e).

18. The manufacturing method of claim 17, wherein the adhesive layer is a water-based binder or a high solid-content binder.

* * * * *